United States Patent
Shimonishi

(10) Patent No.: US 7,110,916 B2
(45) Date of Patent: Sep. 19, 2006

(54) METHOD AND DEVICE FOR REMOTELY MONITORING WATCH INFORMATION FOR MAINTENANCE OF HINGE

(76) Inventor: Takashi Shimonishi, 1426-201, Midorigaoka ikoma-shi, Nara (JP) 630-0262

( * ) Notice: Subject to any disclaimer, the term of this patent is extended or adjusted under 35 U.S.C. 154(b) by 0 days.

(21) Appl. No.: 10/532,883

(22) PCT Filed: Oct. 28, 2003

(86) PCT No.: PCT/JP03/13780

§ 371 (c)(1),
(2), (4) Date: Jun. 9, 2005

(87) PCT Pub. No.: WO2004/047042

PCT Pub. Date: Jun. 3, 2004

(65) Prior Publication Data

US 2006/0167656 A1    Jul. 27, 2006

(30) Foreign Application Priority Data

Oct. 28, 2002    (JP) .............................. 2002-312481

(51) Int. Cl.
*G06F 11/30* (2006.01)
(52) U.S. Cl. .................................................... 702/184
(58) Field of Classification Search ................ 702/184
See application file for complete search history.

(56) References Cited

U.S. PATENT DOCUMENTS

| 4,334,388 A  * | 6/1982 | Kambic .......................... 49/14 |
| 6,542,851 B1 | 4/2003 | Hasegawa et al. |
| 6,577,235 B1 * | 6/2003 | Frys ........................... 340/547 |

FOREIGN PATENT DOCUMENTS

| JP | 2000055791 | 2/2000 |
| JP | 2002131191 | 5/2002 |

* cited by examiner

*Primary Examiner*—Michael Nghiem
*Assistant Examiner*—Demetrius R. Pretlow
(74) *Attorney, Agent, or Firm*—Jordan and Hamburg LLP

(57) ABSTRACT

A method and a device for remote monitoring supervisory information about maintenance of a hinge are provided that are capable of improving efficiency of periodical inspection and maintenance of a hinge and capable of preventing inconvenience and a trouble of the hinge in advance. A hinge 3 rotatably supports an opening and closing member 2 with a fixed member 1 of an instrument or the like. Supervisory information about maintenance of the hinge 3 is detected. The detected supervisory information is transmitted to a maintenance management server 7 via a communication network like the Internet 6. The maintenance management server 7 manages the maintenance of the hinge based on the supervisory information.

6 Claims, 2 Drawing Sheets

METHOD AND DEVICE FOR REMOTELY MONITORING WATCH INFORMATION FOR MAINTENANCE OF HINGE

TECHNICAL FIELD

The present invention relates to a method and a device for remote monitoring supervisory information about maintenance of a hinge that rotatably supports an opening and closing member of a cover having a display, a platen cover, or a door with a fixing member of an instrument main body or a structure (construction) main body respectively, for instruments such as a laptop personal computer, a copying machine, a printer, a scanner, etc., or for a door.

BACKGROUND ART

In general, it is important that a hinge of an instrument as described above functions always satisfactorily. For the maintenance and inspection of the hinge, what is called supervisory information about maintenance is necessary. The "supervisory information about maintenance" of a hinge refers to information of a physical quantity that affects satisfactory work of the hinge and indicates an abnormal state, such as abnormal sound due to a defect of the hinge, a counted number of revolutions (i.e., a rotation number) that is relevant to degradation due to time change like abrasion, temperature and torque that are relevant to the life and work of the hinge.

The above supervisory information about maintenance is so far obtained from a maintenance service provider through periodical inspection or from the maintenance service provider when a user notifies them about an occurrence of an abnormality.

According to the conventional periodical inspection, however, a substantial repair is necessary when a trouble beyond held is found, or on the contrary, an excessive repair is carried out due to too early unnecessary inspection. A necessary inspection level is different depending on a user's using state of an instrument or an environment in which the instrument is positioned. Therefore, inspection timing of the periodical inspection is different depending on the case. There is also variation in the accuracy of information obtained by individual inspectors depending on supervisory abilities and understanding levels. When an abnormality or a trouble occurs before a periodical inspection, a user is forced to carry out an unscheduled repair, and the instrument cannot be used until the repair is completed.

The present invention is made to solve the above conventional problems. It is an object of the present invention to provide a method and a device for remote monitoring supervisory information about maintenance of a hinge, capable of improving efficiency of periodical inspection and maintenance of the hinge and capable of preventing inconvenience and trouble of the hinge in advance.

DISCLOSURE OF THE INVENTION

For a hinge that rotatably supports an opening and closing member with a fixed member of an instrument or the like, a method of remote monitoring supervisory information about maintenance of a hinge according to the present invention has steps of detecting supervisory information about maintenance of the hinge, transmitting the detected supervisory information to a maintenance management server through a communication network such as the Internet, and executing a maintenance management of the hinge by the maintenance management server based on the supervisory information. The supervisory information about maintenance is at least one piece of information selected from among abnormal sound, an opening or closing number, a temperature, and torque of the hinge. An abnormality of a hinge is detected based on the maintenance management. An inspection and repair time is forecast based on the maintenance management. With this arrangement, inefficiency of periodical inspection and maintenance of a hinge can be avoided, and inconvenience and a trouble of the hinge can be prevented in advance.

For a hinge that rotatably supports an opening and closing member with a fixed member of an instrument or the like, a remote monitoring device that monitors supervisory information about maintenance of a hinge according to the present invention has a unit that detects supervisory information about maintenance of the hinge, a unit that transmits the supervisory information detected by the detecting unit to a communication network such as the Internet, and a maintenance management server that is connected to the communication network to obtain the supervisory information and execute a maintenance management of the hinge. The detecting unit obtains at least one piece of information selected from among abnormal sound, an opening or closing number, a temperature, and torque of the hinge. With this arrangement, inefficiency of periodical inspection and maintenance of a hinge can be avoided, and inconvenience and a trouble of the hinge can be prevented in advance.

BEST MODE FOR CARRYING OUT THE INVENTION

A remote monitoring device according to an embodiment of the present invention is explained with reference to the drawings.

Figure 1:
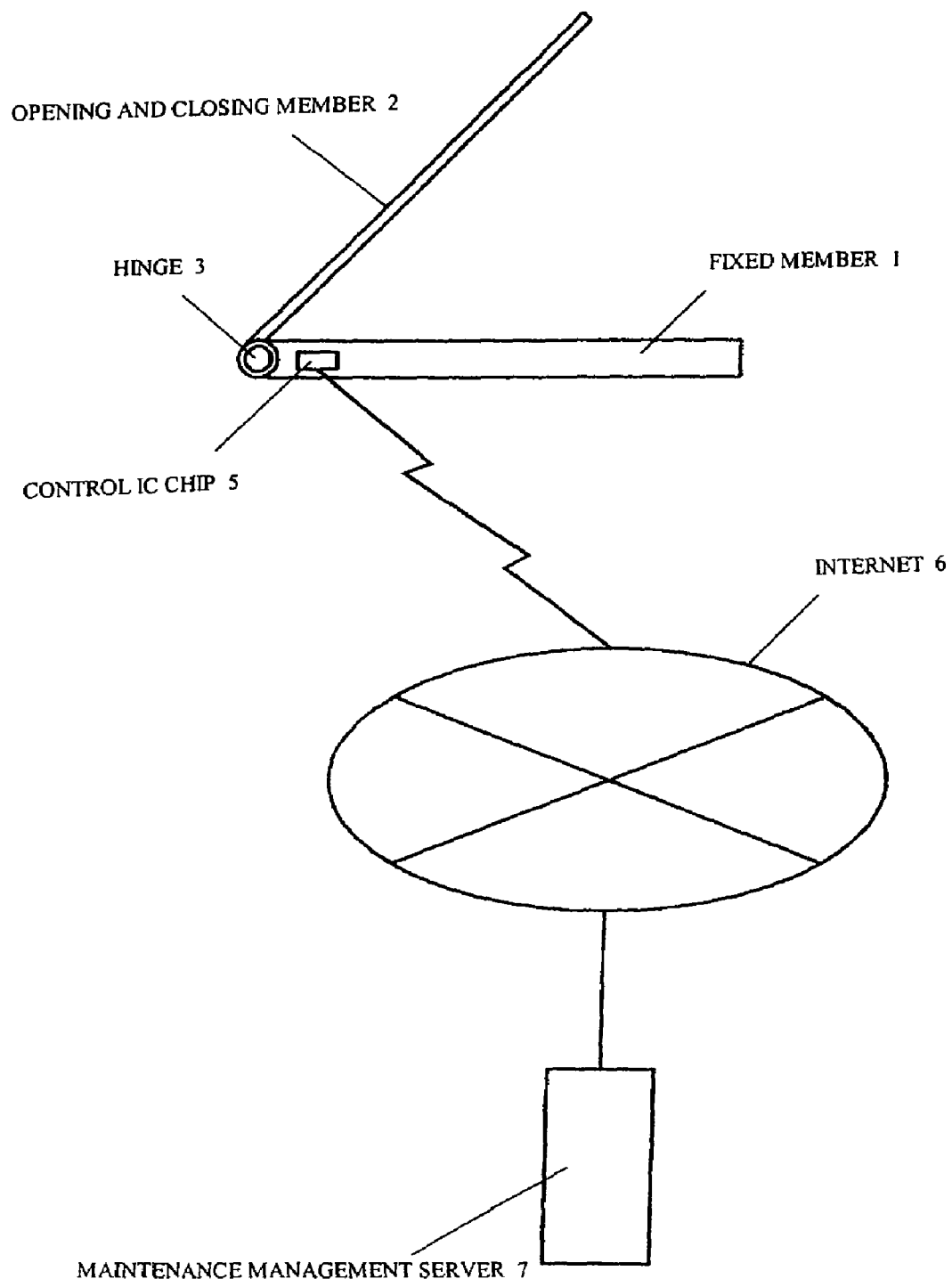
FIG. 1 is an explanatory diagram of a remote monitoring device according to one embodiment of the present invention.

In FIG. 1, a reference number 1 denotes a fixed member as a main body of a laptop personal computer, and 2 denotes an opening and closing member as a cover having a display which is rotatably supported by a hinge 3. The hinge 3 according to the present invention is what is called a friction hinge capable of maintaining an opening angle of the opening and closing member 2 at an optional angle. However, the hinge to which the present invention is applied is not limited to this. For example, the hinge may be that of a copying machine or a scanner. When the opening and closing member of this instrument is a platen cover, a rotation angle of the opening and closing member is restricted, and a pressing force is generated at a predetermined angular area. The hinge may be that of a printer or other instrument. Further, the hinge may be that used for a door of a general structure or construction. In this case, a hinge is used for a fixed member where an opening and closing (rotary) member is opened or closed or rotates. The present invention is applied to these hinges that require maintenance.

Figure 2:
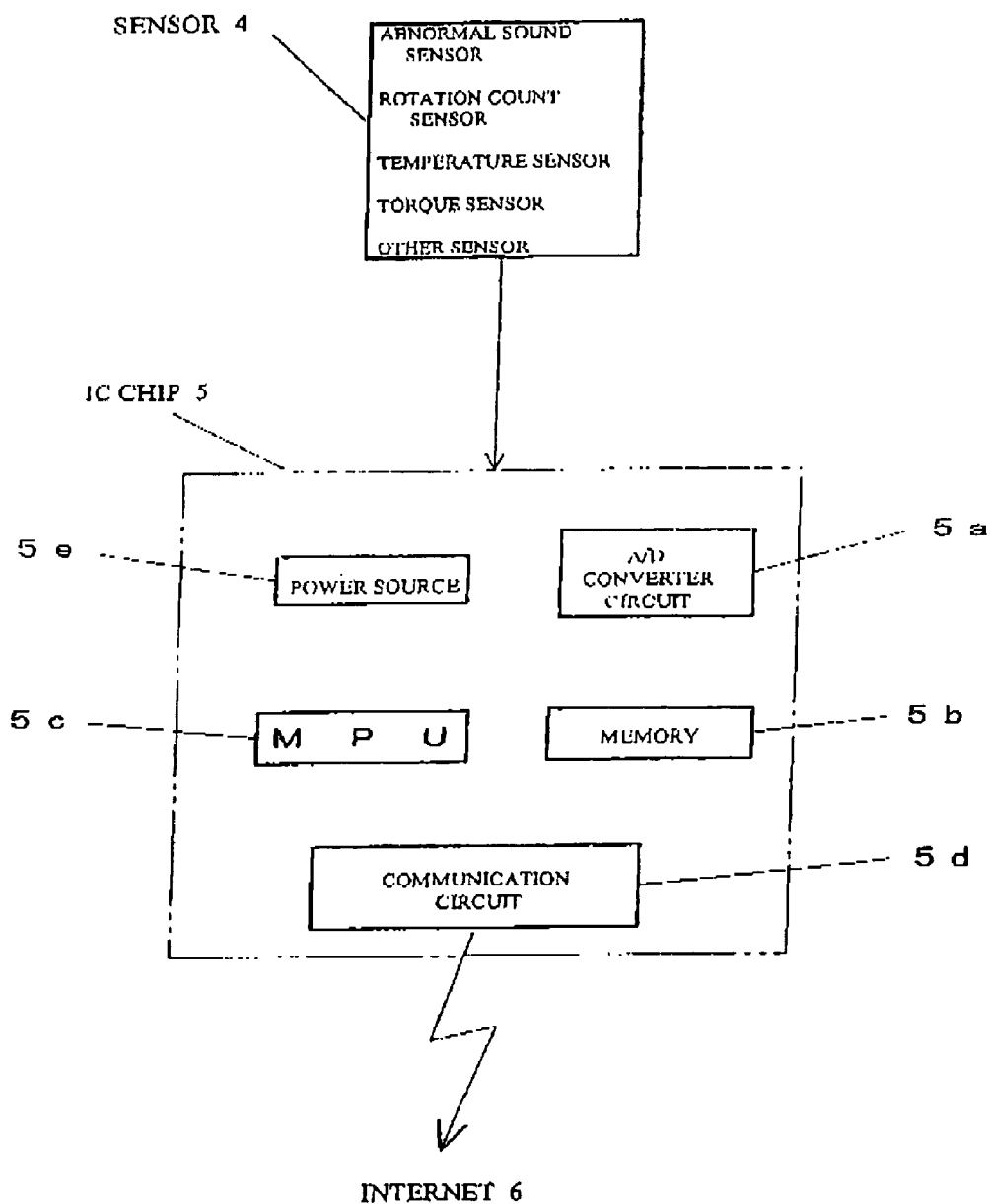
FIG. 2 is an explanatory diagram of the operation of the remote monitoring device according to the embodiment shown in FIG. 1.

As shown in FIG. 2, various sensors 4 are provided on the hinge 3 or near the hinge 3. These sensors 4 detect supervisory information about maintenance of the hinge, such as abnormal sound of the hinge, a rotation number of a hinge opening and closing side, temperature of the hinge, and a physical quantity of torque based on a friction force between hinge members. These sensors 4 include an abnormal sound sensor 4a, a rotation count sensor 4b, a temperature sensor 4c, and a torque sensor 4d, for example.

The abnormal sound sensor 4a outputs oscillation of the hinge portion or sound generated from the hinge portion, as an electric signal.

The rotation number sensor 4b includes an optical rotation sensor like a rotary encoder, a magnetic rotation sensor, etc. that output a rotation number of a hinge rotation side as a digital electric signal.

The temperature sensor 4c is a known temperature sensor such as a thermistor that outputs a temperature as an electric signal. The torque sensor 4d electrically outputs a physical quantity having a correlation with a rotation friction torque of a hinge, like a strain gauge that detects a strain generated in the opening and closing member 2 on a flat plate when the front end of the opening and closing member 2 is manually opened or closed.

Sensors according to the present invention are not limited to the above kinds of sensors. Any sensor that detects information to obtain supervisory information about maintenance to manage maintenance of the hinge, when necessary, can be used.

The supervisory information about maintenance detected by the sensor 4 is output as an analog or digital electric signal.

In FIG. 1 and FIG. 2, a reference number 5 denotes a control IC chip, which includes an A/D (analog/digital) converter circuit 5a, a memory 5b, an MPU (microprocessor) 5c, a communication circuit 5d, and a power source unit 5e. While the control IC chip 5 is fitted to the fixed member 1 of the instrument according to the present embodiment, this can be provided on the opening and closing member 2.

A signal from the sensor 4 is stored in the control IC chip 5. When a signal from the sensor 4 is an analog signal, the A/D converter circuit 5a converts this signal into a digital signal, and stores the converted signal into the memory 5b.

The supervisory information about maintenance stored in the memory 5b is transmitted from the communication circuit 5d when necessary. The MPU 5c controls the sensors 4, the A/D converter circuit 5a, the memory 5b, the communication circuit 5d, and the power source circuit 5e according to predetermined programs.

The power source unit 5e supplies power that is necessary for the sensors 4 and the control IC chip 5. The power source can be any one of all known power sources such as a power source of the instrument, an own battery, and cells (dry cells, small cells like button cells, solar cells, and fuel cells).

The control IC chip is not limited to that according to the embodiment. A control IC chip that is connected to a communication network and that can transmit supervisory information about maintenance detected by the sensors 4 to the maintenance management server 7 can be used.

Data signal transmitted from the communication circuit 5d is transmitted to the maintenance management server 7 via the Internet 6. According to the present embodiment, an antenna element built in the communication circuit 5d makes a direct access to the Internet to transmit the data signal. However, the present invention is not limited to this method. Alternatively, the communication circuit 5d is connected to a personal computer by wire or by air, and the data signal is transmitted to the Internet via the connected instrument, for example.

The communication network according to the present invention is not limited to the Internet 6, and can be other advanced information communication network.

The maintenance management server 7 monitors a status or a using state of the hinge 3 based on supervisory information obtained via the communication network.

A status of the hinge 3 is monitored as follows. When abnormal sound, an abnormal rise in temperature, or a torque change is detected, a decision is made such that inspection and repair is immediately necessary, and this decision is notified to an inspection and repair service function. A using state is monitored as follows. A number of opening and closing, a sound state, a temperature change, a torque change are monitored over a long period, and an inspection and repair time is forecast.

The invention claimed is:

1. A method of remote monitoring supervisory information about maintenance of a hinge, for the hinge that rotatably supports an opening and closing member with a fixed member of an instrument or the like, the method comprising the steps of: detecting supervisory information about maintenance of the hinge; storing the detected supervisory information into a control IC chip fitted to the fixed member or the closed member; transmitting the supervisory information from the control IC chip to a maintenance management server through a communication network such as the Internet; and executing a maintenance management of the hinge by the maintenance management server based on the supervisory information.

2. The method of remote monitoring supervisory information about maintenance of a hinge according to claim 1, wherein the supervisory information about maintenance is at least one piece of information selected from among abnormal sound, an opening or closing number, a temperature, and torque of the hinge.

3. The method of remote monitoring supervisory information about maintenance of a hinge according to claim 1 or 2, wherein an abnormality of a hinge is detected based on the maintenance management.

4. The method of remote monitoring supervisory information about maintenance of a hinge according to claim 1 or 2, wherein an inspection and repair time is forecast based on the maintenance management.

5. A remote monitoring device that monitors supervisory information about maintenance of a hinge, for the hinge that rotatably supports an opening and closing member with a fixed member of an instrument or the like, the device comprising: a unit that detects supervisory information about maintenance of the hinge; a control IC chip that stores the supervisory information detected by the detecting unit, and transmits the supervisory information to a communication network like the Internet; and a maintenance management server that is connected to the communication network to obtain the supervisory information and execute a maintenance management of the hinge.

6. The remote monitoring device according to claim 5, wherein the detecting unit obtains at least one piece of information selected from among abnormal sound, an opening or closing number, a temperature, and torque of the hinge.

* * * * *